United States Patent
Sing et al.

(10) Patent No.: US 12,374,747 B1
(45) Date of Patent: Jul. 29, 2025

(54) BATTERY CRADLE SYSTEM FOR A ROBOT

(71) Applicant: Amazon Technologies, Inc., Seattle, WA (US)

(72) Inventors: Samrin Sing, Sammamish, WA (US); Mary Elizabeth Conrad, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 412 days.

(21) Appl. No.: 17/934,998

(22) Filed: Sep. 23, 2022

(51) Int. Cl.
| | |
|---|---|
| *H01M 50/244* | (2021.01) |
| *B25J 9/00* | (2006.01) |
| *B60L 50/64* | (2019.01) |
| *B60L 53/12* | (2019.01) |
| *B60L 53/14* | (2019.01) |
| *B60L 53/80* | (2019.01) |
| *H01M 10/44* | (2006.01) |
| *H01M 50/249* | (2021.01) |
| *H01M 50/256* | (2021.01) |
| *H01M 50/262* | (2021.01) |
| *H01M 50/267* | (2021.01) |

(Continued)

(52) U.S. Cl.
CPC ......... *H01M 50/244* (2021.01); *B25J 9/0009* (2013.01); *B60L 50/64* (2019.02); *B60L 53/12* (2019.02); *B60L 53/14* (2019.02); *B60L 53/80* (2019.02); *H01M 10/44* (2013.01); *H01M 50/249* (2021.01); *H01M 50/256* (2021.01); *H01M 50/262* (2021.01); *H01M 50/267* (2021.01); *H02J 7/00047* (2020.01); *H02J 7/0045* (2013.01); *H02J 50/10* (2016.02); *H01M 2220/20* (2013.01)

(58) Field of Classification Search
CPC .. H01M 50/244; H01M 10/44; H01M 50/249; H01M 50/256; H01M 50/262; H01M 50/267; H01M 2220/20; B25J 9/0009; B60L 50/64; B60L 53/12; B60L 53/14; B60L 53/80; H02J 7/00047; H02J 7/0045; H02J 50/10
USPC ........................................................ 320/108
See application file for complete search history.

(56) References Cited

U.S. PATENT DOCUMENTS

| | | | |
|---|---|---|---|
| 10,071,578 B2 * | 9/2018 | Sing ......................... | B41J 25/34 |
| 11,718,195 B2 * | 8/2023 | Kadoko .................. | B60L 53/35 |
| | | | 320/109 |

(Continued)

FOREIGN PATENT DOCUMENTS

| | | | | |
|---|---|---|---|---|
| CN | 108713999 A | * | 10/2018 | ........... A47L 9/2873 |
| CN | 210363460 U | * | 4/2020 | ............. Y02T 10/70 |

(Continued)

*Primary Examiner* — M Baye Diao
(74) *Attorney, Agent, or Firm* — Knobbe, Martens, Olson & Bear, LLC (57) ABSTRACT

A system for removably coupling a battery assembly to a robot or charging system is provided herein. The system can include a cradle body, one or more connectors, and one or more charging interfaces. The cradle body can removably couple to and support a battery of varying shapes and sizes. The cradle body can wrap around at least a portion of the battery. The one or more connectors can be attached to the cradle body to releasably engage corresponding connectors of a robot when the battery assembly is coupled to the robot. The one or more charging interfaces can be attached to the cradle body via which power is provided to the battery to charge the battery.

19 Claims, 8 Drawing Sheets

(51) Int. Cl.
*H02J 7/00* (2006.01)
*H02J 50/10* (2016.01)

(56) References Cited

U.S. PATENT DOCUMENTS

| | | | | |
|---|---|---|---|---|
| 2004/0150368 | A1* | 8/2004 | Horigome | H01M 10/4257 320/132 |
| 2006/0092141 | A1* | 5/2006 | Amani | A47B 23/002 345/173 |
| 2007/0075679 | A1* | 4/2007 | Ha | G06F 1/1632 320/114 |
| 2014/0184144 | A1* | 7/2014 | Henricksen | H02J 7/0044 34/104 |
| 2014/0222271 | A1* | 8/2014 | Merten | H02J 50/10 701/22 |
| 2016/0094070 | A1* | 3/2016 | Mazzone | H02J 7/0044 320/115 |
| 2022/0089237 | A1* | 3/2022 | Sverdlov | B25J 9/1697 |
| 2023/0187950 | A1* | 6/2023 | Shen | H02J 7/0045 320/115 |
| 2024/0079818 | A1* | 3/2024 | Burns | B60L 53/302 |

FOREIGN PATENT DOCUMENTS

| | | | | |
|---|---|---|---|---|
| DE | 212017000132 U1 | * | 1/2019 | A47L 5/225 |
| EP | 1760995 A2 | * | 3/2007 | G06F 1/1626 |
| KR | 101497686 B1 | * | 3/2015 | H02J 50/10 |
| KR | 20220092110 A | * | 7/2022 | A47L 11/4091 |
| WO | WO-2016133859 A1 | * | 8/2016 | B41J 29/023 |
| WO | WO-2022015576 A1 | * | 1/2022 | B60L 53/16 |

* cited by examiner

BATTERY CRADLE SYSTEM FOR A ROBOT

BACKGROUND

Robots can be used in warehouses or other storage or fulfillment centers for various tasks. These robots are operated by batteries which require charging. Typical battery assemblies are assembled directly within the robot. These battery assemblies can have a number of small parts, any of which could need replacing or repairing at any time. In many instances, technological improvements can require that a new battery assembly be paired with a robot. As such, it can be time consuming and costly to disassemble the robot to only repair or replace one small part.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

The battery cradle systems described herein act as an intermediary part allowing batteries of various shapes and sizes to be used with a robot and/or charging system. The battery cradle systems can decouple the robot and battery interface from the battery and charger interface allowing for independent development. This provides many benefits and advantages including cleaner cable routing, easier replacements and repairs, the ability to accommodate battery assemblies of various shapes and sizes, and the ability to adapt to changing technology. For example, development of the battery assembly and or robot can continuously develop until all components are optimized.

Figure 1:
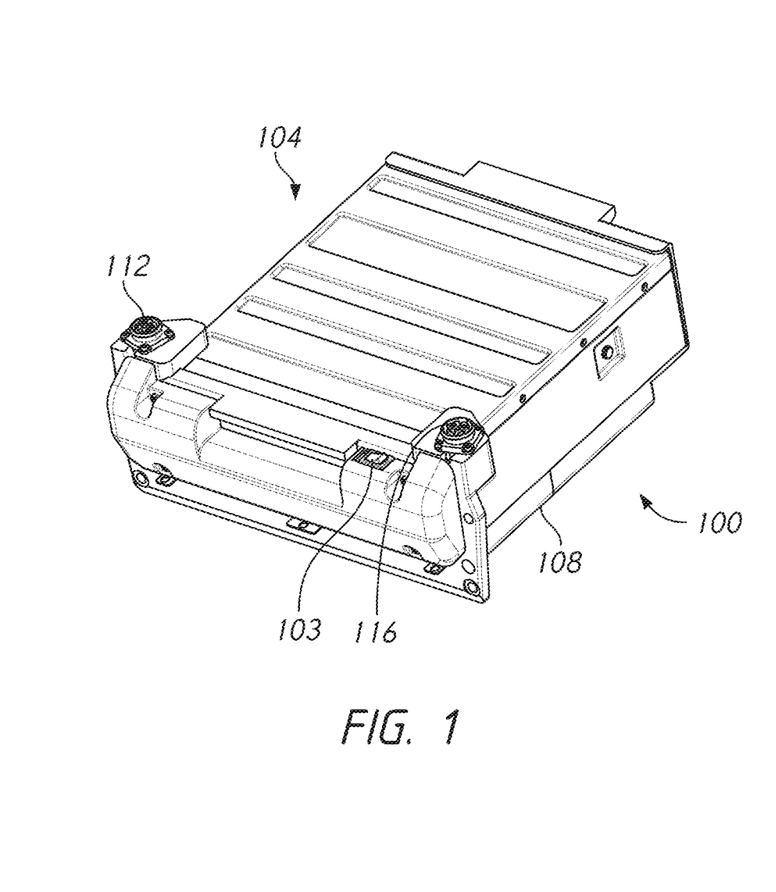
FIGS. 1 and 2 are perspective views of an example embodiment of a battery cradle system having a battery assembly positioned therein.
Figure 2:
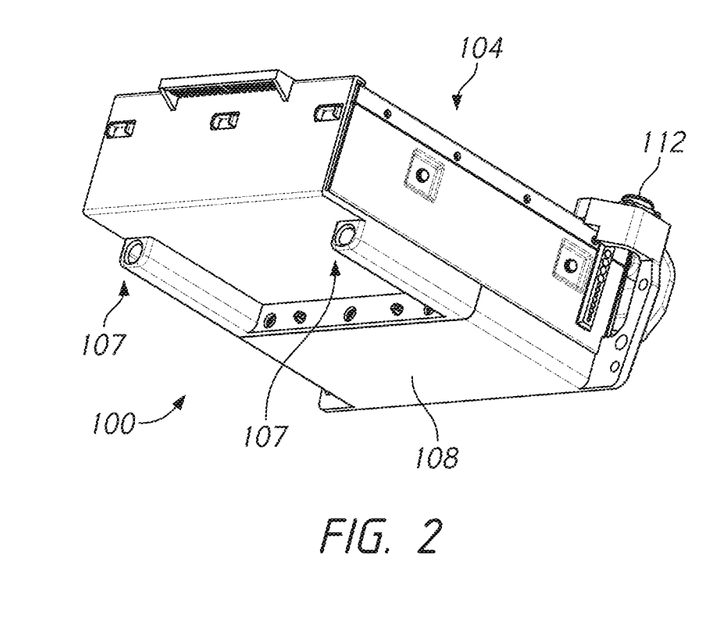
Figure 3:
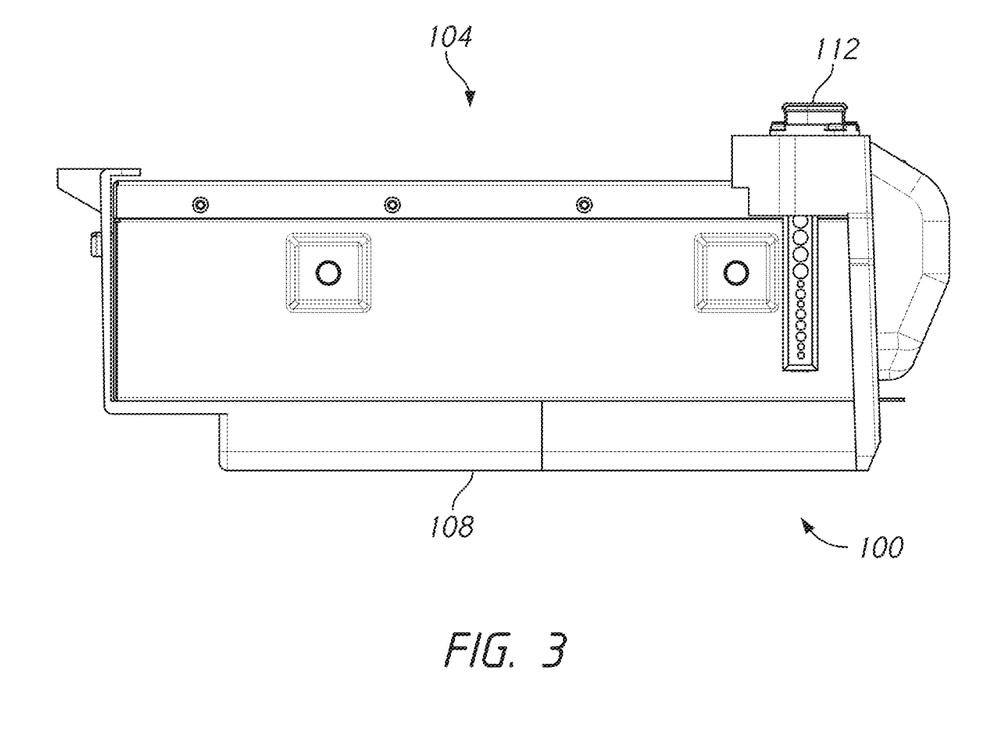
FIG. 3 is a sideview of the battery cradle system of FIG. 1.
Figure 4:
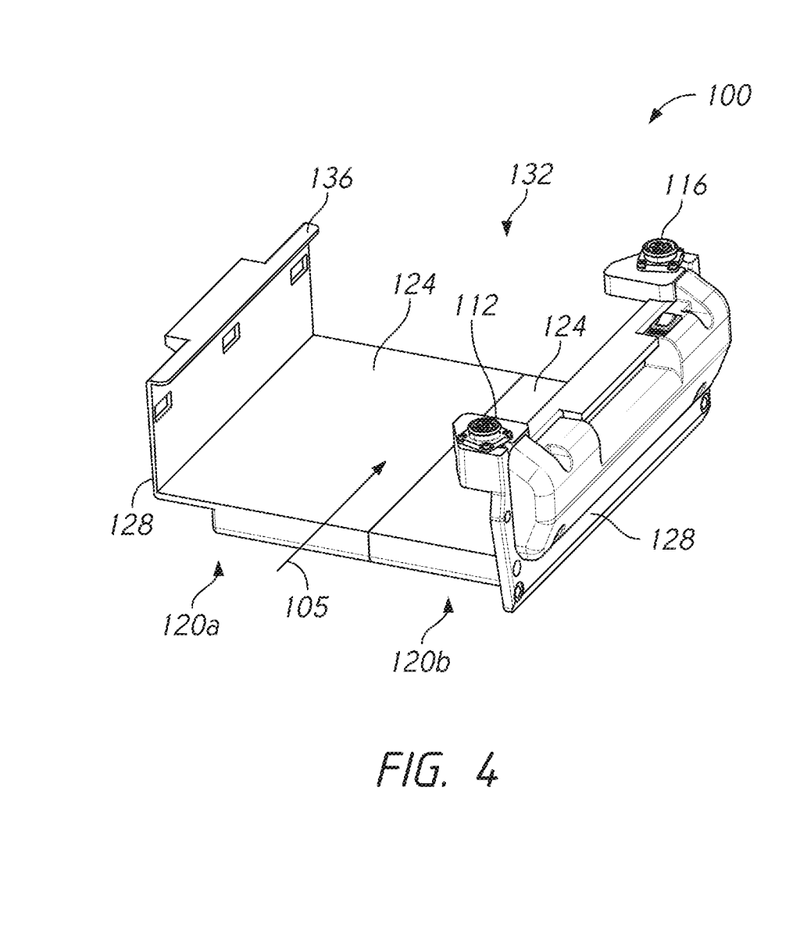
FIG. 4 is a perspective view of the battery cradle system of FIG. 1 with the battery assembly removed.
Figure 5:
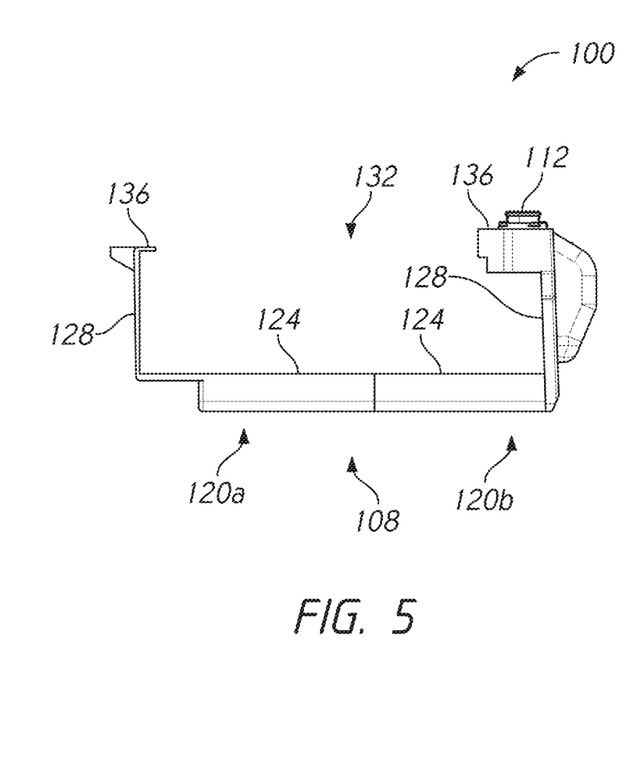
FIG. 5 is a sideview of the battery cradle system of FIG. 1 with the battery assembly removed.
Figure 6:
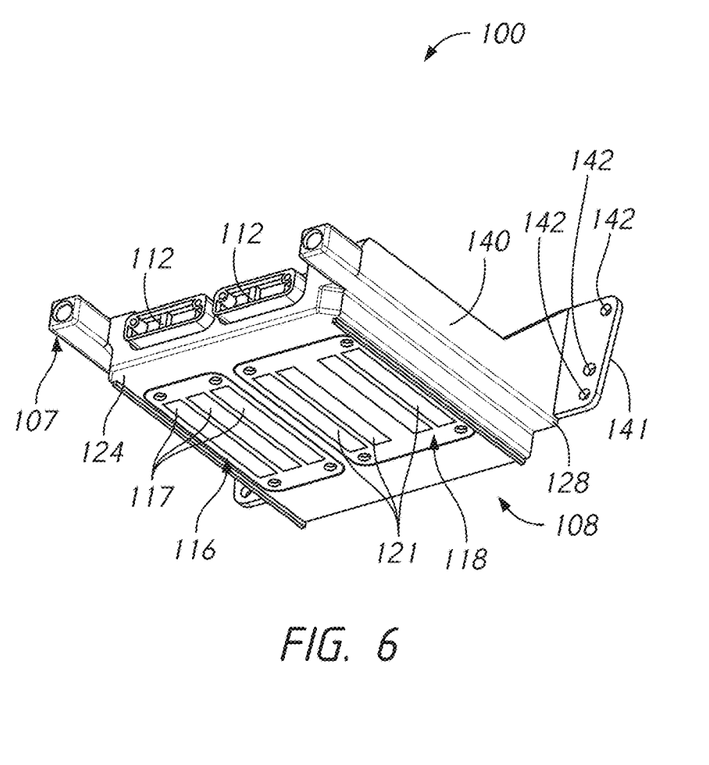
FIG. 6 is a bottom perspective view of an example embodiment of a battery cradle system having charge contacts and data contacts on a bottom surface.

FIGS. 1-7 are views of various embodiments of a battery cradle system 100. FIGS. 1-3 and 7 illustrate a battery or battery assembly 104 at least partially disposed within, supported by or otherwise attached to the battery cradle system 100, while FIGS. 4-6 illustrate the battery cradle system 100 with the battery assembly 104 removed. The battery cradle system 100 can be used to removably couple the battery assembly 104 to a robot or charging system (e.g., charging station of a charging system), for example, as shown in FIGS. 12A-12D. The battery assembly 104 can include various electronics in addition to the battery. For example, the battery assembly 104 can include antennas, onboard chargers, and other electronics, for example, that facilitate and/or enable operation of the robot. The battery cradle system 100 can have a cradle body 108. The cradle body 108 can wrap around at least a portion of the battery assembly 104. As such, the entire battery assembly 104 does not need to be enclosed by the cradle body 108. The cradle body 108 can include multiple parts fastened together or be a single unitary (e.g., monolithic, seamless) piece as described in more detail below. The cradle body 108 can removably couple to and support the battery assembly 104. The battery assembly 104 can include a battery of varying shapes and sizes, as well as other electronic components.

The cradle body 108 can be made of any suitable material. Non-limiting examples include plastics and metals. Example methods of manufacturing the cradle body 108 include injection molding, 3D printing, and machining.

The battery cradle system 100 can have one or more connectors 112 attached to the cradle body 108. The connectors 112 can releasably engage corresponding connectors of a robot when the battery cradle system 100 is coupled to the robot. The connectors 112 can electrically couple the cradle body 108 to the robot to transfer power from the battery assembly 104 to the robot. The battery cradle system 100 can have one or more charging interfaces 116 attached to the cradle body 108. The charging interfaces 116 can provide power from a power source to the battery assembly 104 to charge the battery assembly 104 (e.g., when the cradle body 108 is coupled to a charging station). In some embodiments, the battery cradle system 100 can include data contact interfaces 118, as shown in FIG. 6. Non-limiting examples of data that can be transferred from the robot and/or battery include mapping data, camera images, sensor data, temperature data, travel recorder data (e.g., torque, speed, variations in temperature, sensor alerts), battery health data, historical charging data, and state of charge. The connectors 112, charging interfaces 116, and data contact interfaces 118 are all discussed in more detail below. The battery cradle system 100 can include a switch 103 (e.g., a Battery Management Systems switch) for turning the battery assembly 104 on and off.

The cradle body 108 of the battery cradle system 100 can include alignment features 107 that can assist in positioning the battery cradle system 100 in a desired location of the robot or charging station, as shown in FIGS. 2 and 6-8. The alignment features 107 can extend from a location at or near an end of the cradle body 108 such that when the battery cradle system 100 is connected to a robot or charging station, the alignment features 107 engage corresponding alignment features of the robot or charging stations. For example, the alignment features 107 can be protrusions size and shaped to engage corresponding recesses and/or the alignment features 107 can be recesses sized and shaped to engage corresponding protrusions.

FIGS. 4 and 5 are views of an example embodiment of the battery cradle system 100 with the battery assembly 104 removed. In some embodiments, the cradle body 108 can include a first segment 120a and a second segment 120b. In some embodiments, the first segment 120a and the second segment 120b can be separate parts coupled together. In some embodiments, the first segment 120a and the second segment 120b can be a single integral or unitary part (e.g., monolithic, seamless). One or both segments 120a, 120b can include a support surface 124. One or both segments 120a, 120b can include a wall 128 extending from an end of the support surface 124. The wall 128 can extend generally perpendicular or orthogonal to the support surface 124. For example, in some embodiments both segments 120a, 120b can include a support surface 124 and a wall 128. In other embodiments one segment 120a, 120b can only be a wall 128 while the other segment 120 includes a wall 128 and a larger support surface 124. The walls 128 and the support surfaces 124 can define a receiving area 132. The receiving area 132 can receive the battery assembly 104 (e.g., at least partially extend about or at least partially enclose the battery assembly 104). The support surface(s) 124 can support the battery assembly 104 when disposed within the receiving area 132 of the battery cradle system 100.

In some embodiments, one or both segments 120a, 120b can include a flange 136. The flange 136 can further define the receiving area 132. The flange 136 can extend from an end of the wall 128 toward the receiving area 132 such that a portion of the receiving area 132 is positioned between a bottom surface of the flange 136 and the support surface 124. The flange 136 can extend generally parallel to the support surface 124 and generally perpendicular or orthogonal to the wall 128. The flange 136 can assist in securing the battery assembly 104 to the cradle body 108. For example, the flange 136 can extend over at least a portion of the battery assembly 104 to inhibit (e.g., prevent) movement of the battery assembly 104 relative to the cradle body 108, for example in the vertical direction or direction away from the support surface 124. As such, the flange 136 can assist in retaining the battery assembly 104 in contact with the support surface 124.

The battery assembly 104 can be inserted into the battery cradle system 100 through one of the open sides. For example, as indicated by arrow 105 in FIG. 4. The battery assembly 104 can be inserted such that a bottom surface rests on the support surfaces 124 and the upper surface of the battery assembly 104 is secured by the flanges 136. In embodiments, where the first segment 120a and second segment 120b are separate parts, the first segment 120a and second segment 120b can be assembled around the battery assembly 104. For example, the first segment 120a can be positioned at or near a first end of the battery assembly 104 and the second segment 120b can be positioned at or near a second end of the battery assembly 104 and then the first and second segments 120a, 120b can be coupled together (e.g., via fasteners, such as screws). In other embodiments, the first and second segments 120a, 120b can be coupled together first and the battery assembly 104 inserted second.

Figure 7:
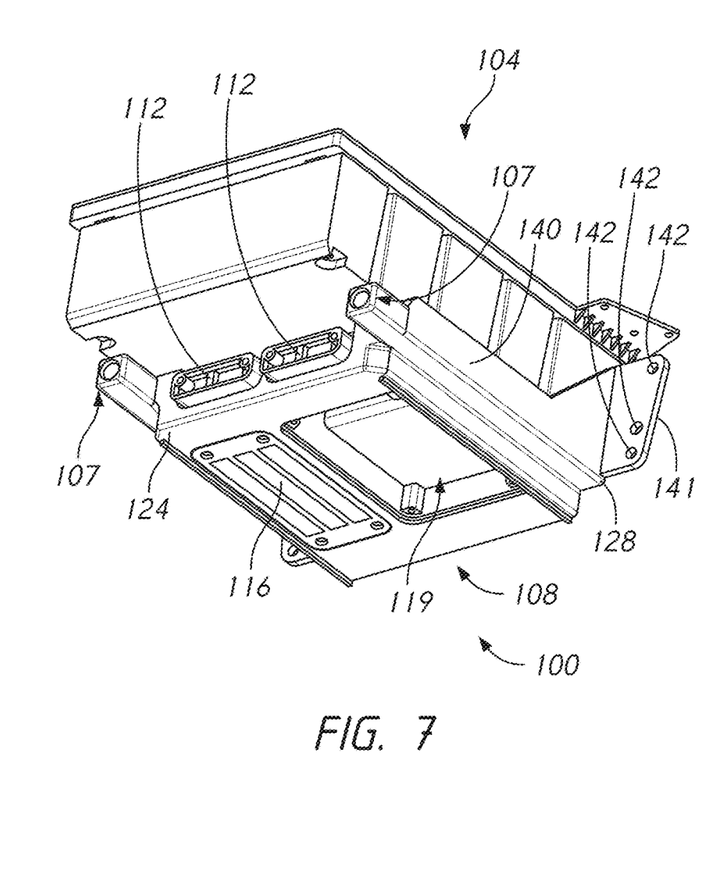
FIG. 7 is a bottom perspective view of the battery cradle system of FIG. 6 having a battery assembly disposed thereon and the data contacts removed to show a pocket for electronic components.

FIGS. 6 and 7 illustrate another example embodiment of the battery cradle system 100. The cradle body 108 of the battery cradle system 100 can include the support surface 124 extending generally perpendicular or orthogonal to the end wall 128. In some embodiments, the battery cradle system 100 can include sidewalls 140 extending from side edges of the support surface 124. The sidewalls 140 can extend up from the support surface 124 and be generally perpendicular to the end wall 128 to assist in securing the battery assembly 104 to the battery cradle system 100. The sidewalls 140 can prevent or reduce movement of the battery assembly 104 in the direction perpendicular to the length of the sidewalls 140. The sidewalls 140 can be any shape and height. For example, the sidewalls 140 can extend up at angle such that the height of the sidewalls 140 varies. Additionally, the sidewalls 140 can vary in length. In some embodiments, the sidewalls 140 can extend the entire length of the support surface 124. In other embodiments, the sidewalls 140 can extend only a portion of the length of the support surface 124.

In some embodiments, the cradle body 108 can include flanges 141. The flanges 141 can extend outward from the end wall 128 and past the width of the support surface 124. The flanges 141 can have one or more fastening holes 142 to mechanically secure the battery cradle system 100 to the robot or charging station. The flanges 141 can work with the alignment features 107 to secure the battery cradle system 100 in the desired location of the robot or charging station.

Figure 10:
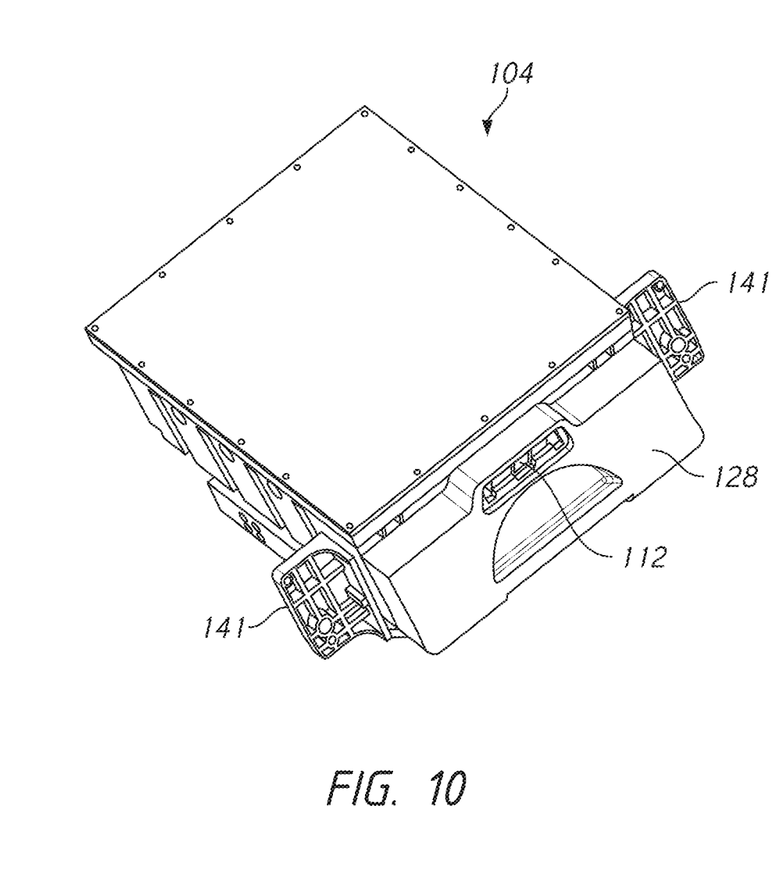
FIG. 10 is a perspective view of an example embodiment of a battery cradle system having a connector positioned on a wall of the cradle body.

As described above, the battery cradle system 100 can include one or more connectors 112 to releasably engage corresponding connectors of a robot when the battery cradle system 100 is coupled to the robot. The connectors 112 can be positioned on a side surface of the cradle body 108, for example one of the walls 128, as shown in FIG. 10, or at an end of the support surface 124, as shown in FIGS. 6 and 7 (e.g., providing a blind connection when the cradle body 108 is coupled to a robot or charging station). In some embodiments, the connectors 112 can be positioned on an upper surface of the battery cradle system 100, as shown in FIGS. 1-5. In embodiments, having more than one connector 112 the connectors 112 can be positioned in various locations. For example, one connector 112 can be positioned on an upper surface of the battery cradle system and one connector 112 can be positioned on a side surface of the cradle body 108, or any other variation.

Figure 8:
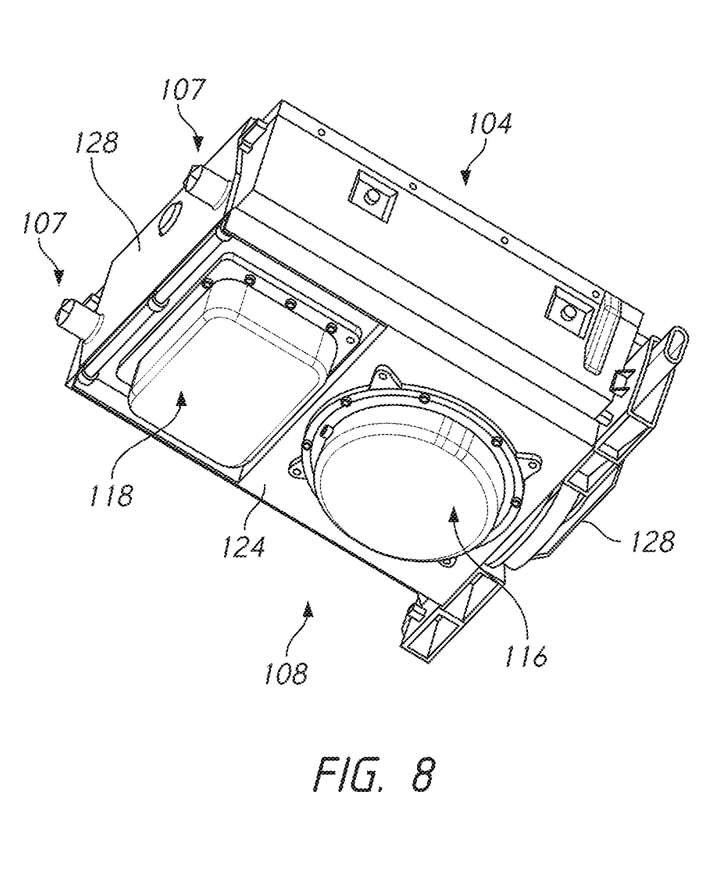
FIG. 8 is a perspective view of an example embodiment of a battery cradle system having an inductive charging interface positioned on a bottom surface of the battery cradle assembly.
Figure 9:
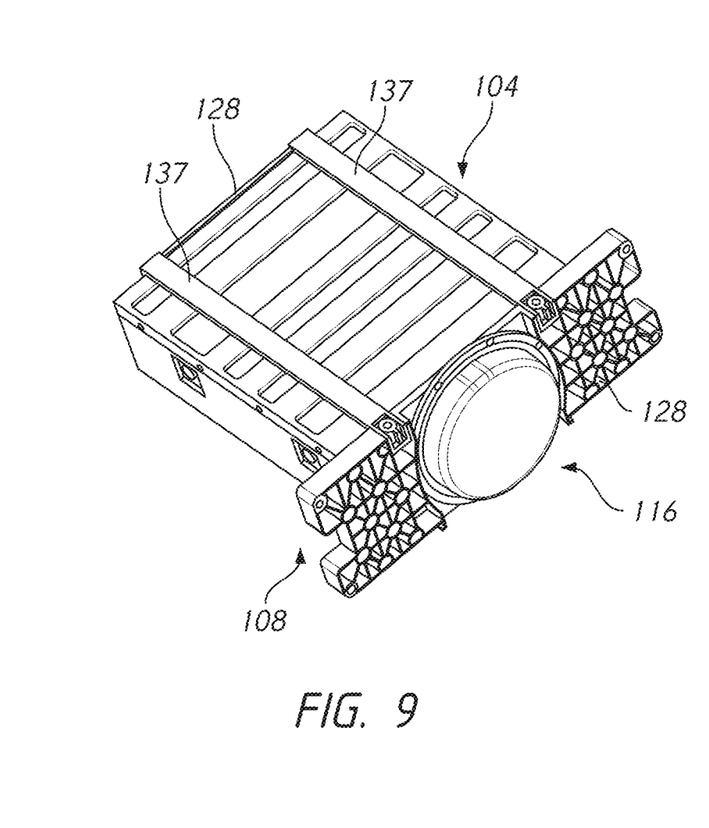
FIG. 9 is a perspective view of an example embodiment of a battery cradle system having an inductive charging interface positioned on a side surface of the battery cradle system.

As described above, the battery cradle system 100 can include one or more charging interfaces 116. In some embodiments, the charging interface 116 can include one or more charging strips 117 (e.g., strip-shaped electrical connections), for example as shown in FIGS. 6 and 7. The charging strips 117 can connect the battery cradle system 100 (and the battery of the battery assembly 104) to a power source when coupled to a charging station via a direct connection. In some embodiments, the charging interface 116 can be an inductive antenna capable of receiving power via inductive coupling, as shown in FIGS. 8 and 9. The one or more charging interfaces 116 can be positioned on a bottom surface of the battery cradle system 100 (see FIGS. 6-8), a side surface of the battery cradle system 100 (see FIGS. 9 and 10), and/or an upper surface of the battery cradle system 100 (see FIGS. 1 and 4). In embodiments, having more than one charging interface 116, the charging interfaces 116 can be positioned in various locations. The flexibility in the positioning of the charging interfaces allows the battery cradle system 100 and robot to interact with various charging locations. For example, the robot will be able to use a charging location that has a horizontal orientation, for example a charger located in a floor, and/or the robot will be able to use a charging location that has a vertical orientation, for example a charger located in a wall.

As described above, the battery cradle system 100 can include one or more data contact interfaces 118 to transfer data between the battery cradle assembly and/or robot and a charging interface, as shown in FIGS. 6 and 8. In some embodiments, the data contact interfaces 118 can include one or more contact strips 121. In some embodiments, the data contact interfaces 118 can be an inductive antenna allowing transfer of data without direct contact. In some embodiments, the data contact interfaces 118 can enclose electronics stored within one or more pockets or recesses 119 in the cradle body 108. The stored electronics can operate or work with the data contact interfaces 118.

Figure 11:
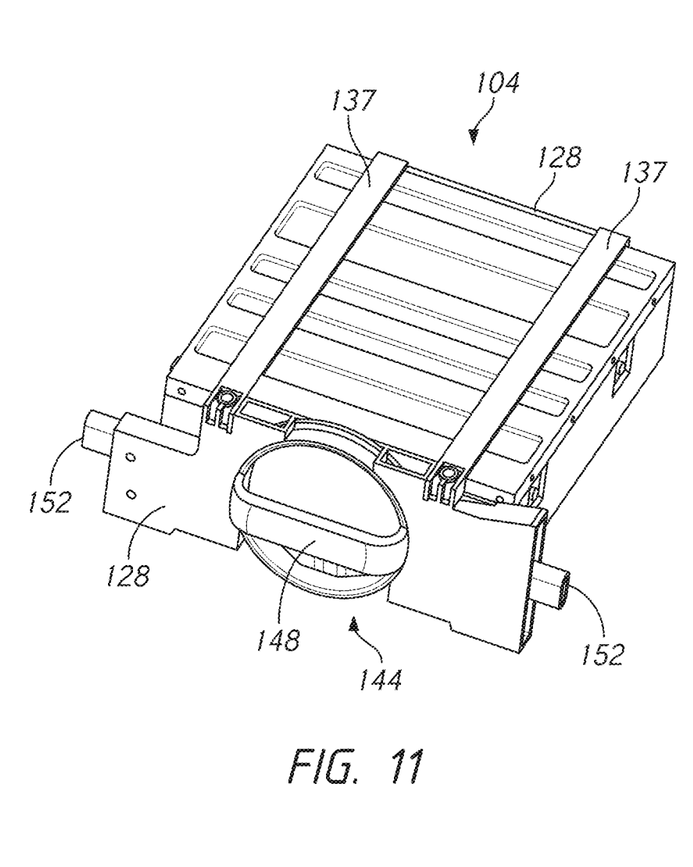
FIG. 11 is a perspective view of an example embodiment of a battery cradle system having a handle assembly for engaging and disengaging a robot or charging system.

In some embodiments, the battery cradle system 100 can include one or more straps 137, as shown in FIGS. 9 and 11. The strap 137 can extend from one end of the support surface 124 and/or the wall 128 to a second end of the support surface and/or the other wall 128. As such, the strap 137 can extend over a top surface of the battery assembly 104 and/or a side surface of the battery assembly 104. In some embodiments, a first portion of the strap 137 can extend generally perpendicular from one end of the support surface 124 and as such replace or function as the wall 128. A second portion of the strap 137 can then extend at a hinge or pivot point from the first portion generally parallel to the support surface 124.

In some embodiments, the strap 137 can extend along the length of the battery assembly 104. In some embodiments, the strap 137 can extend along the width of the battery assembly 104. In some embodiments, the strap 137 can extend at an angle across the top surface of the battery assembly 104. The strap 137 can be pivotally connected at a hinge to the cradle body 108 at a first end such that the strap 137 can pivot between an open and closed position. For example, the strap 137 can be pivoted to an open position to allow the battery assembly 104 to be positioned within the battery cradle system 100. Once the battery assembly 104 is positioned within the battery cradle system 100, the strap 137 can be pivoted to the closed positioned securing the battery assembly 104 to the battery cradle system 100. The strap 137 can then be pivoted to an open position to remove the battery assembly 104 from the battery cradle system 100. Straps 137, in some embodiments, allow for coupling of different size batteries to battery cradle system 100.

In some embodiments, the battery cradle system 100 can include a handle assembly 144, for example, as shown in FIG. 11. The handle assembly 144 can define a portion of the wall 128 or be coupled to the wall 128. The handle assembly 144 can include an actuatable handle 148 and a locking mechanism 152. The handle 148 can be rotatable in one direction (e.g., clockwise) to engage and rotatable in an opposite direction (e.g., counterclockwise) to disengage the locking mechanism 152 with the robot or charging station. The locking mechanism 152 can include one or more protrusions or mechanical levers 152 that can extend or rotate relative to the wall 128 (when the handle 148 is actuated to engage the locking mechanism) to align with and engage corresponding recesses in the robot or charging station. Similarly, the one or more protrusions or mechanical levers 152 can retract or rotate relative to the wall 128 (when the handle 148 is actuated to disengage the locking mechanism) to allow for decoupling of the cradle body 108 from the robot or charging station. In some embodiments, the protrusions can rotate away from the corresponding recesses to disengage the locking mechanism 152. The handle assembly 144 can facilitate inserting and/or removing the battery cradle system 100 from a robot or charging station.

Figure 12A:
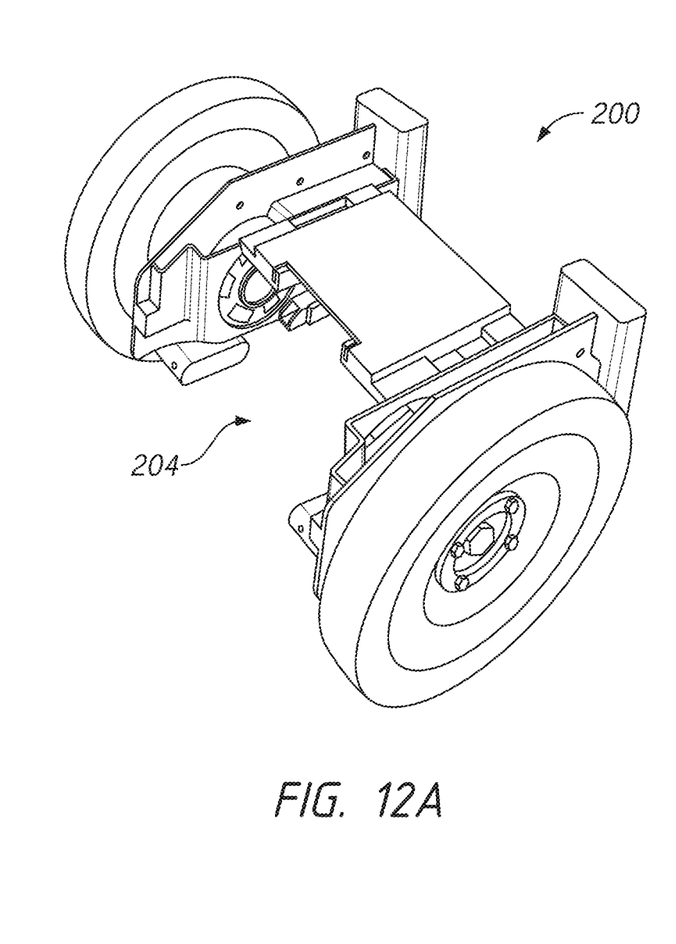
FIGS. 12A-12D illustrate a method of connecting a battery cradle system to a robot.
Figure 12B:
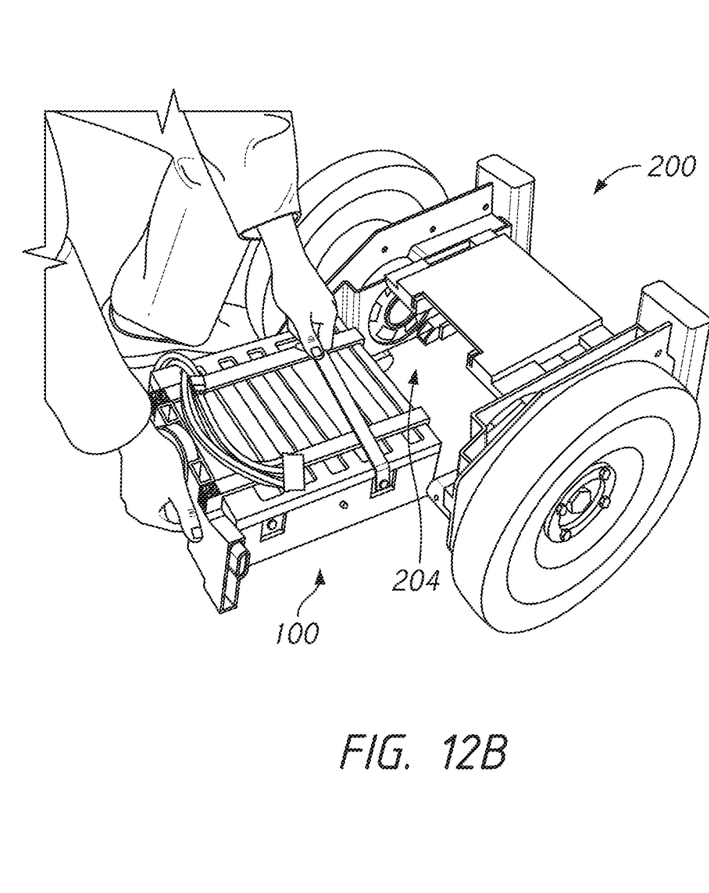
Figure 12C:
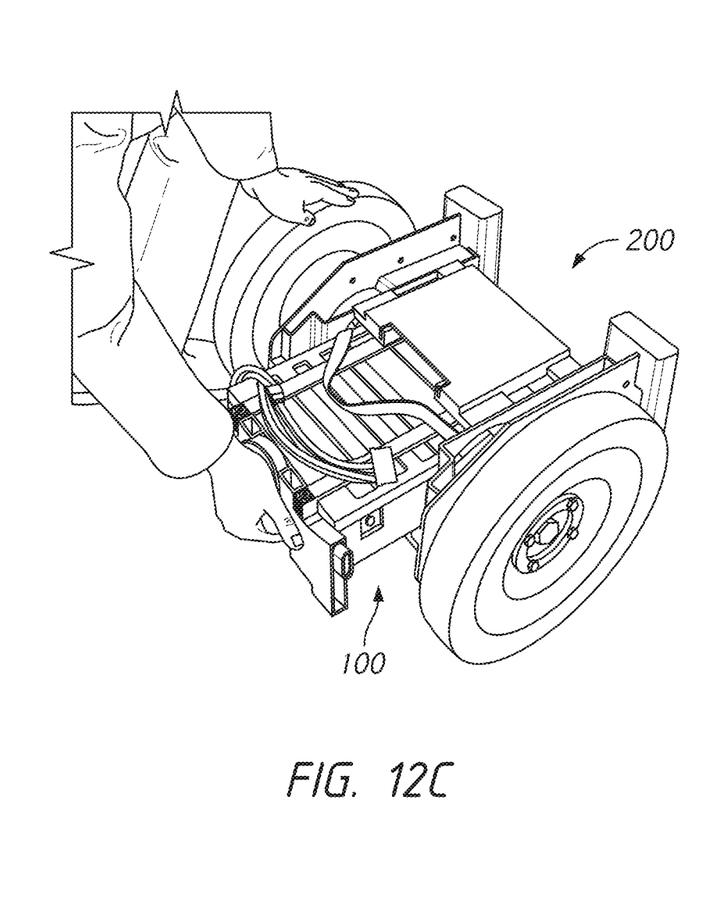
Figure 12D:
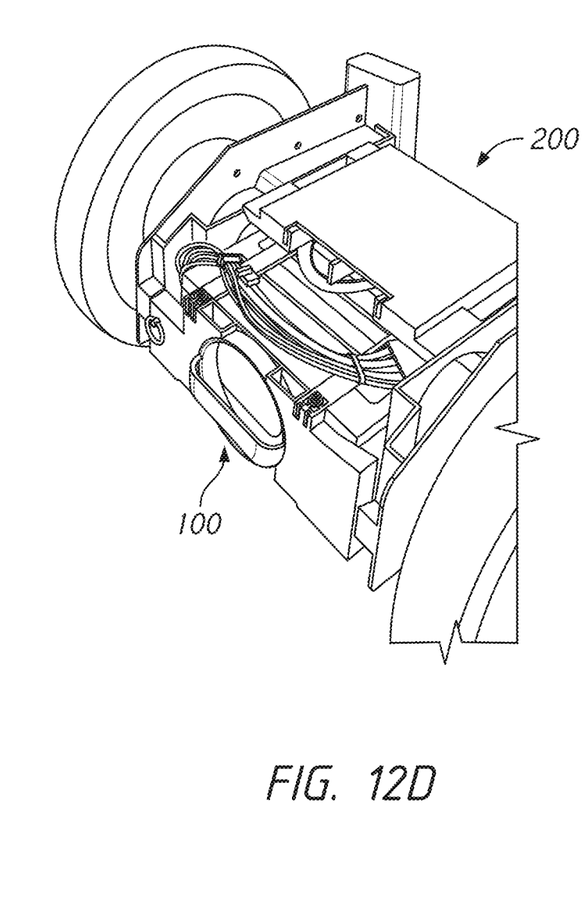

FIGS. 12A-12D illustrate a method of removably coupling the battery cradle system 100 to a portion of a robot 200. FIG. 12A illustrates the portion of the robot 200 without the battery cradle system 100 coupled therein. The portion of the robot 200 can have a receiving area 204 to receive the battery cradle system 100. The receiving area 204 can be sized and shape to correspond to the battery cradle system 100 (e.g., to the size or form factor of the battery cradle system 100) and/or battery assembly 104. FIGS. 12B-12C illustrates the battery cradle system 100 being aligned with and positioned in the receiving area 204 of the portion of the robot 200. FIG. 12D illustrates the battery cradle system 100 coupled to the portion of the robot 200. Once inserted into the receiving area 204, the battery cradle system 100 can be electrically coupled to the portion of the robot 200 via at least one connector 112.

In some embodiments, the handle assembly 144 can be used to removably couple the battery cradle system 100 to the portion of the robot 200. As described herein, the handle assembly 144 can be selectively actuatable to actuate the locking mechanism 152 between an engaged and disengaged position to lock and unlock the battery cradle system 100 to the portion of the robot 200. For example, the handle 148 can be rotated to engage or disengage mechanical couplers 152 from corresponding recesses in the robot.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A system for removably coupling a battery assembly to a robot or charging system, comprising:
 a cradle body configured to removably couple to and support a battery of varying shapes and sizes, the cradle body configured to wrap around at least a portion of the battery;
 one or more connectors attached to the cradle body and configured to releasably engage corresponding connectors of a robot when the battery assembly is coupled to the robot; and
 one or more charging interfaces attached to the cradle body via which power is provided to the battery to charge the battery.

2. The system of claim 1, wherein the cradle body comprises multiple parts fastened together.

3. The system of claim 1, further comprising a handle movably coupled to the cradle body and to a locking mechanism, the handle selectively actuatable to actuate the locking mechanism between an engaged and disengaged position to lock and unlock the cradle body relative to a robot or charging system.

4. The system of claim 1, wherein the one or more charging interfaces are positioned on a bottom surface of the cradle body.

5. The system of claim 1, wherein the one or more charging interfaces are inductive antennas configured to receive power via inductive coupling.

6. A system for removably coupling a battery assembly to a robot or charging system, comprising:
 a cradle body comprising:
  a first segment and a second segment, each segment comprising:
   a wall comprising a first end and a second end, the first end extending generally perpendicular from a first end of a support surface;
   a flange extending generally parallel to the support surface extending from the second end of the wall; and
  a connector configured to releasably engage the cradle body to the robot, wherein a second end of each support surface are connected together to form a receiving area defined by the wall of the first segment, the wall of the second segment, the support surface of the first segment, and the support surface of the second segment.

7. The system of claim 6, wherein the first and second segments are mechanically coupled.

8. The system of claim 6, wherein the first and second segments are integral.

9. The system of claim 6, further comprising at least one strap pivotally connected to the wall of the first segment or the wall of the second segment, the at least one strap configured to pivot between an open and closed position, wherein when in the closed position the at least one strap is connected to the wall of the first segment and the wall of the second segment.

10. The system of claim 6, further comprising a charging interface configured to charge the battery assembly when connected to a charging station.

11. The system of claim 6, further comprising a handle movably coupled to the cradle body and to a locking mechanism, the handle selectively actuatable to actuate the locking mechanism between an engaged and disengaged position to lock and unlock the cradle body relative to a robot or charging system.

12. A system for removably coupling a battery assembly to a robot and a charging system, comprising:
a cradle body comprising:
   a support surface extending from a first end to a second end;
   a first wall extending generally orthogonal from the first end of the support surface;
   a connector positioned on a first surface of the cradle body, the connector configured to couple the cradle body to the robot; and
   a charging interface positioned on a second surface of the cradle body, the second surface different than the first surface, the charging interface configured to charge the battery assembly when connected to the charging system.

13. The system of claim 12, wherein the charging interface is positioned on the first wall.

14. The system of claim 12, wherein the charging interface is positioned on a bottom surface of the support surface.

15. The system of claim 12, wherein the charging interface comprises an inductive antenna configured to receive power via inductive coupling.

16. The system of claim 12, wherein the charging interface comprises one or more charge contacts.

17. The system of claim 12, further comprising a second wall having a first end and a second end, the first end extending orthogonal from the second end of the support surface.

18. The system of claim 12, further comprising a handle movably coupled to the cradle body and to a locking mechanism, the handle selectively actuatable to actuate the locking mechanism between an engaged and disengaged position to lock and unlock the cradle body relative to a robot or charging system.

19. The system of claim 12, wherein the cradle body further comprises one or more pockets configured to receive electronics.

* * * * *